F. V. PHILLIPS.
SAW GUARD.
APPLICATION FILED MAR. 21, 1913.

1,074,198.

Patented Sept. 30, 1913.

Witnesses:
Annie Cooper

Inventor:
Francis V. Phillips,
By
Attorney.

UNITED STATES PATENT OFFICE.

FRANCIS VOSBURGH PHILLIPS, OF ORLANDO, FLORIDA.

SAW-GUARD.

1,074,198.  Specification of Letters Patent.  Patented Sept. 30, 1913.

Application filed March 21, 1913.  Serial No. 755,997.

*To all whom it may concern:*

Be it known that I, FRANCIS V. PHILLIPS, a citizen of the United States, residing at Orlando, in the county of Orange and State of Florida, have invented new and useful Improvements in Saw-Guards, of which the following is a specification.

This invention relates to guards for circular saws, the object being to provide a guard which will effectively hold the work against backward movement and thus prevent injury to the operator or damage to the work.

It has heretofore been proposed to provide a guard with a roller which would operate by the back pressure on the work to wedge itself between the work and an inclined track or guide-way, and thus hold the work firmly against the saw table. In such prior devices it is necessary to make the angle of the inclined guide-way comparatively small to secure a firm wedging action, but there is always the liability of the roller being advanced by the work away from the inclined track so that there is always a tendency to slippage of the work before wedging action takes place. To overcome this objection, I have provided a roller having teeth which mesh with an inclined rack; means being provided for keeping the roller in mesh with the rack. The teeth operate with a biting action on the work and their engagement with the rack prevents slippage. I am also enabled to employ a somewhat greater angle of upward movement of the roller, and this adds to promptness of action and allows a greater upward movement within a comparatively small forward travel.

In the accompanying drawings I have illustrated one form of guard embodying my invention, and after a detail description thereof, the features deemed novel will be specified in the appended claims.

Figure 1:
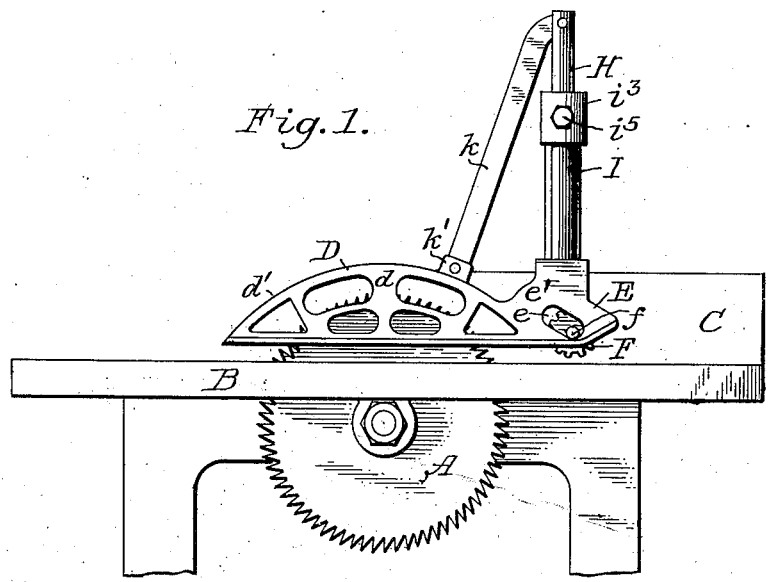
Figure 2:
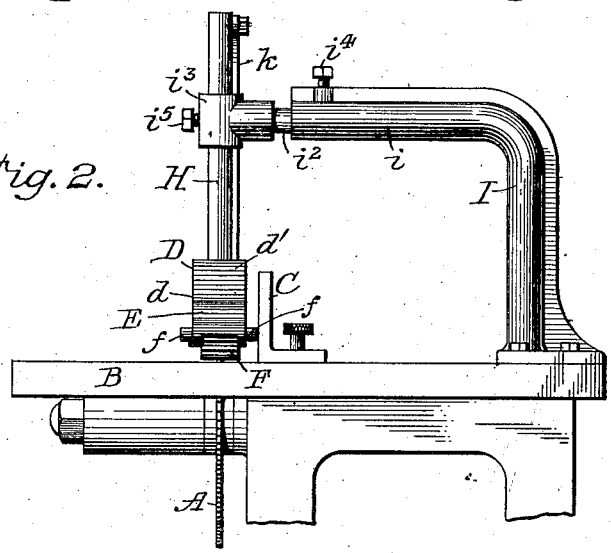
Figure 3:
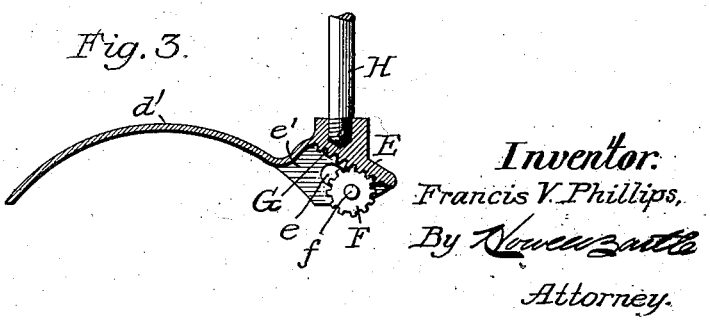

Referring to the drawings, Figure 1 is a side elevation of a circular saw with my improved guard in operative position thereon. Fig. 2 is an end elevation of Fig. 1, and Fig. 3 is a longitudinal section of the guard removed from the saw.

A indicates the circular saw, B the work table, and C the work guide. The guard D is in the form of a hood which is adjustably suspended over the saw from a suitable support. The particular form of the hood is immaterial, and the support may be in any form suitable for the machine to which it is applied. As shown, the guard D consists of an open work side plate $d$ in the form of a segment of a circle and provided at its curved edge with a flange $d'$ preferably conforming to the curvature of the saw. This guard is adjustably suspended over the saw with the straight edge of the side plate $d$ parallel with the work table and sufficiently above the same to permit the passage of the work beneath said guard.

The guard is provided at one end with an integral hood or housing E in which the toothed roller F is mounted, said roller being provided with trunnions $f$ which project through inclined slots $e$ formed in the side walls $e'$ of said housing. An inclined rack G is provided on the inner surface of the upper wall of the housing, said rack being parallel with the inclined slots $e$ in the side walls of the housing. The lower inclined walls of the slots $e$ operate to at all times keep the teeth of the roller in mesh with the teeth of the rack. The roller is arranged to normally hang below the lower surface of the guard and in a direct line with the saw and slightly below the upper surface of the work to be operated on. When the work is advanced to the saw the roller will be raised by and rest upon the upper surface thereof. It will now be seen that any backward movement of the work will be instantly arrested by the wedging of the roller F between the work and an inclined rack G, and that the teeth of the roller will operate upon the work and against the rack to absolutely prevent slippage.

In order that the guard may be firmly held against upward pressure exerted upon the roller by backward pressure on the work, I place a supporting rod directly above the roller housing so that all upward pressure is in direct line therewith. As shown, said rod H is provided with a threaded lower end which is in engagement with a threaded socket formed on the upper wall of the roller housing E. The rod is adjustably suspended from a bracket I secured to the work table B, or to any other suitable support. Said bracket is provided with a horizontal tubular arm $i$, in which is slidably mounted a rod $i^2$ carrying a hub or collar $i^3$ in which the rod H is slidably mounted. The rod $i^2$ is horizontally adjustable in the tubular arm $i$ of the bracket, and is secured in adjusted position by a set screw $i^4$. The rod H is vertically adjustable in the collar $i^3$ and is secured in adjusted position by set screw $i^5$. The hood portion of the guard is braced by a link $k$ secured at one end to a lug $k'$ on the guard D, and at the opposite end to the upper end of the rod H. With this form of mounting, all of the strain is in vertical direction in line with the rod H, so that there can be no twisting or lateral motion due to resiliency of the guard or its mounting, as is the case when the support is applied at a point removed from the wedging roller.

Having thus described my invention, what I claim as new and desire to secure by Letters Patent is:—

1. In a saw guard, the combination with a roller adapted to be engaged by the work to be operated on, an inclined rack arranged to wedge the roller between said rack and said work on backward movement of said work, teeth carried by said roller, and means for keeping said teeth in mesh with said rack.

2. In a saw guard, the combination of a toothed roller adapted to be engaged by the work to be operated on, an inclined rack arranged to wedge the roller between said rack and said work when the latter is moved rearwardly, and means for keeping said roller in mesh with said rack.

3. The combination with a guard adapted to house the upper portion of a circular saw, of a roller carried by said guard in line with said saw, an inclined track on said guard adapted to wedge said roller between said track and the work to be operated on when the latter is moved in a rearward direction, and a support for said guard arranged substantially in line with the upward pressure exerted by said roller in its wedging action.

In testimony whereof I have hereunto set my hand in presence of two subscribing witnesses.

FRANCIS VOSBURGH PHILLIPS.

Witnesses:
GEO. W. PHILLIPS,
H. B. LEAKE.